United States Patent
Liu et al.

(10) Patent No.: US 10,873,743 B2
(45) Date of Patent: Dec. 22, 2020

(54) STEREOSCOPIC DISPLAY DEVICE AND STEREOSCOPIC DISPLAY CONTROL METHOD

(71) Applicants: BEIJING BOE DISPLAY TECHNOLOGY CO., LTD., Beijing (CN); BOE TECHNOLOGY GROUP CO., LTD., Beijing (CN)

(72) Inventors: Sha Liu, Beijing (CN); Hongshu Zhang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/392,011

(22) Filed: Apr. 23, 2019

(65) Prior Publication Data
US 2020/0021797 A1     Jan. 16, 2020

(30) Foreign Application Priority Data
Jul. 13, 2018    (CN) .......................... 2018 1 0770345

(51) Int. Cl.
*H04N 13/00*      (2018.01)
*H04N 13/398*     (2018.01)
(Continued)

(52) U.S. Cl.
CPC ......... *H04N 13/398* (2018.05); *H04N 13/305* (2018.05); *H04N 13/395* (2018.05);
(Continued)

(58) Field of Classification Search
CPC ............. H04N 13/00; H04N 7/00; G09G 3/00
See application file for complete search history.

(56) References Cited

U.S. PATENT DOCUMENTS

| 9,591,297 B2 | 3/2017 | Yu et al. | |
| 2006/0238545 A1* | 10/2006 | Bakin | G02B 30/27 |
| | | | 345/613 |

(Continued)

FOREIGN PATENT DOCUMENTS

| CN | 102023393 A | 4/2011 |
| CN | 102577405 A | 7/2012 |

(Continued)

OTHER PUBLICATIONS

Office Action, including Search Report, for Chinese Patent Application No. 201810770345.3, dated Jun. 19, 2019, 19 pages.

*Primary Examiner* — Maryam A Nasri
(74) *Attorney, Agent, or Firm* — Westman, Champlin & Koehler, P.A.

(57) ABSTRACT

A stereoscopic display device and a stereoscopic display control method are provided. The stereoscopic display device includes a display unit and a layering-control unit on a light exiting side of the display unit, wherein, the layering-control unit comprises a microlens drive electrode array and a microlens array being controllable, and wherein microlenses in the microlens array being controllable are driven by drive electrodes of the microlens drive electrode array and exhibit respective focal lengths corresponding to voltages of the drive electrodes of the microlens drive electrode array.

5 Claims, 4 Drawing Sheets

(51) Int. Cl.
  *H04N 13/395* (2018.01)
  *H04N 13/305* (2018.01)
  G09G 3/3208 (2016.01)
  G09G 3/36 (2006.01)

(52) U.S. Cl.
  CPC ............ *G09G 3/3208* (2013.01); *G09G 3/36* (2013.01); *H04N 2013/0081* (2013.01)

(56) References Cited

U.S. PATENT DOCUMENTS

| | | | |
|---|---|---|---|
| 2014/0192173 | A1 | 7/2014 | Yu et al. |
| 2017/0195659 | A1 | 7/2017 | Du et al. |
| 2019/0035364 | A1* | 1/2019 | Iwasaki .................. G02F 1/163 |
| 2019/0139472 | A1 | 5/2019 | Liu |

FOREIGN PATENT DOCUMENTS

| | | |
|---|---|---|
| CN | 102654697 A | 9/2012 |
| CN | 105929537 A | 9/2016 |
| CN | 106375694 A | 2/2017 |
| CN | 107783304 A | 3/2018 |
| WO | 2011/055276 A1 | 5/2011 |

* cited by examiner

US 10,873,743 B2

STEREOSCOPIC DISPLAY DEVICE AND STEREOSCOPIC DISPLAY CONTROL METHOD

CROSS-REFERENCE TO RELATED APPLICATION

The present application claims the benefit of Chinese Patent Application No. 201810770345.3 filed on Jul. 13, 2018 in the State Intellectual Property Office of China, the whole disclosure of which is incorporated herein by reference.

TECHNICAL FIELD

The present disclosure relates to the field of image display technologies, and in particular, to a stereoscopic display device and a stereoscopic display control method.

BACKGROUND

Currently in the related art of stereoscopic display, technologies for naked-eyed stereoscopic imaging can be roughly divided into three types: a holographic type, a multi-planar type, and a parallax images type. Among them, a holographic stereo imaging requires utility of a three-color laser source and a relatively complicated structure, which is barely used in a manufacture of displays, while the other two types are more common. A display of the parallax images type creates both a right eye visible area and a left eye visible area at a certain distance, and each of the right eye visible area and the left eye visible area has a width of only about 65 mm. Therefore, when the viewer moves slightly, he or she is likely to enter an inversion area of the left eye and the right eye, which is highly prone to dizziness and discomfort feeling. The multi-planar stereo display mainly uses a plurality of superimposed display panels to display images of the same size on different panels, and uses different distances between objects and the viewer, differences in brightness and in color, and then overlaps the front and rear object images, thereby creating a visually three-dimensional sense for the viewer. It is easier for a viewer to have a comfortable visual experience. In order to ensure a viewer experience of feeling the stereoscopic display, it is necessary to perform pattern splitting to images and to perform imaging on different planes. In this way, it will bring about a large number of arithmetic processing problems; in addition, interlayer spacing among layers of panels are required to be strictly controlled; in addition, such a superimposed arrangement of a plurality of layers of panels also causes a brightness loss of the display device. The existence of these problems brings many difficulties to the design and manufacture of the display device, and also has an adverse effect on the display effect.

SUMMARY

According to an aspect of the present disclosure, there is provided a stereoscopic display device comprising a display unit and a layering-control unit on a light exiting side of the display unit, wherein, the layering-control unit comprises a microlens drive electrode array and a microlens array being controllable, and wherein microlenses in the microlens array being controllable are driven by drive electrodes of the microlens drive electrode array and exhibit respective focal lengths corresponding to voltages of the drive electrodes of the microlens drive electrode array.

In some embodiments of the present disclosure, the microlens array comprises a plurality of microlenses which are uniformly distributed, each microlens being used to independently image different display regions of the display unit respectively.

In some embodiments of the present disclosure, the microlens array comprises a plurality of microlens sets, each microlens set being used to independently image different display regions of the display unit respectively.

In some embodiments of the present disclosure, the microlenses of the microlens array is disposed corresponding to pixel points of the display unit respectively, and the number of the microlenses is the same as the number of pixel points of the display unit, the position of the microlenses are in one-to-one correspondence with the positions of the pixel points of the display unit, respectively.

In some embodiments of the present disclosure, the microlens set of the microlens array is configured such that the corresponding display regions are imaged on image planes of a same depth of field.

In some embodiments of the present disclosure, the display unit is an organic light emitting diode (OLED) display unit.

According to another aspect of the present disclosure, there is provided a stereoscopic display control method for performing a display control to the stereoscopic display device mentioned above, comprising steps as follows: acquiring a multi-plane stereoscopic display signal of the current frame, the multi-plane stereoscopic display signal comprises a display signal of N layers of sub-images for realizing multi-plane stereoscopic display which are obtained by an image split of the current frame, where N is an integer greater than or equal to 2, and the sub-image comprises effective display pixels and non-effective display pixels; determining, according to the multi-plane stereoscopic display signal, a microlens set $L_i$, $i \in [1, N]$ which is in correspondence with the effective display pixel positions contained in each layer of sub-image $M_i$; dividing a display time of the current frame into N time segments; performing following time-sharing driving operations in each time segment $T_i$: controlling the display unit to display the sub-image $M_i$ corresponding to the current time segment $T_i$; controlling the focal length of the microlens in the microlens set $L_i$ such that the display unit is imaged on a image plane $P_i$ through the microlens set $L_i$; the image plane $P_i$ is a display plane corresponding to the sub-image $M_i$ when a multi-planar stereoscopic display is realized.

In some embodiments of the present disclosure, the step of the acquiring the multi-plane stereoscopic display signal of the current frame comprises: obtaining an image of the current frame; determining a depth of field of each pixel location in the image according to the image of the current frame; performing an image split to the pixel points according to a preset range of depth of field, and dividing the pixel points into N sets depending on respective a range of the depth of field to which the depth of field of each of the pixel points belongs; taking the pixel points in each set as effective pixel points in the sub-image of a corresponding layer.

In some embodiments of the present disclosure, the step of determining, according to the multi-plane stereoscopic display signal, a microlens set $L_i$ which is in correspondence with the effective display pixel positions contained in each layer of sub-image $M_i$ comprises: determining a position distribution pattern $P_i$ of the effective display pixels contained in each layer of sub-image $M_i$; determining, according to the position distribution pattern $P_i$ of the effective display pixels, a microlens set Li corresponding to the positions of the effective display pixels.

In some embodiments of the present disclosure, the step of controlling the display unit to display the sub-image Mi corresponding to the current time segment Ti: controlling the display unit to normally display the effective display pixels in the sub-image Mi; displaying the non-effective display pixels in the sub-image Mi in following manner: controlling to perform a full dark display of the lowest brightness of the non-effective display pixels when the display unit is a liquid crystal display unit having a backlight; controlling the position corresponding to the non-effective display pixel not to be displayed and to be in a transparent state when the display unit is an Organic Light Emitting Diode (OLED) display unit without a backlight.

According to another aspect of the present disclosure, there is provided a non-transitory computer readable storage medium in which a computer program has been stored, wherein the stereoscopic display control method mentioned above is implemented when the computer program is executed by a computer processor.

According to another aspect of the present disclosure, there is provided a display comprising the stereoscopic display device mentioned above.

BRIEF DESCRIPTION OF THE DRAWINGS

The above and/or additional aspects and advantages of the present disclosure will become apparent and readily understood from the following description of the embodiments in conjunction with the drawings, in which.

DETAILED DESCRIPTION OF EMBODIMENTS

Figure 1:
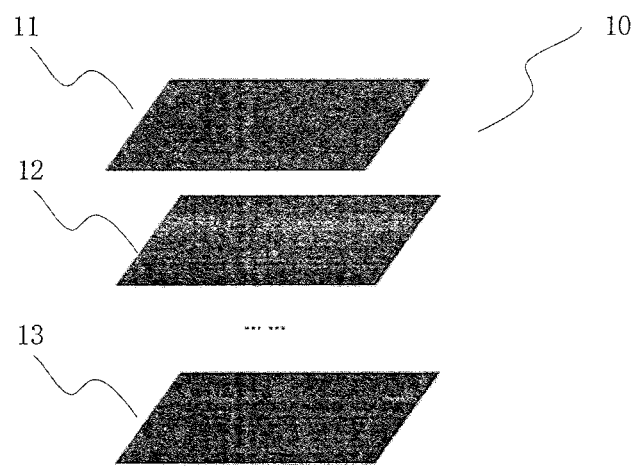
FIG. 1 is a schematic diagram showing a stereoscopic display structure of a multi-plane stereoscopic display device of related art.

The embodiments of the present disclosure are described in detail below, and the examples of the embodiments are illustrated in the drawings, wherein the same or similar reference signs are used to refer to same or similar elements or elements having the same or similar functions. The embodiments described below with reference to the drawings are illustrative, and are not intended to be construed as limiting to the present disclosure.

In the multi-planar stereoscopic display device of related art, a plurality of display panels are used to form different display planes. Referring to FIG. 1, FIG. 1 is a schematic diagram showing a stereoscopic display structure of a multi-plane stereoscopic display device of related art. A display device 10 includes a plurality of display layers, i.e., a first display layer 11, a second display layer 12 up to the Nth display layer 13. Each display layer displays different parts of a split image respectively; and finally a stereoscopic display may be realized by presenting discrete screen information on different display layers. However, this design scheme requires that interlayer spacing among the screens of the respective display layers are kept in an even distribution in an order of several millimeters. In addition, there are problems of a brightness loss of display and the display device being excessively bulky due to an increase in the number of display layers.

Such a layered and split-screen display form essentially realizes a stereoscopic display control depending on space allocation. In view of the deficiencies of the existing multi-planar stereoscopic display device, the present disclosure provides a novel stereoscopic display device that is simpler in structure and easier to manufacture, and a stereoscopic display control method based on a combination of time division and spatial segmentation.

The stereoscopic display device and the stereoscopic display control method of the embodiments of the present disclosure will be described in detail below with reference to the accompanying drawings.

Figure 2:
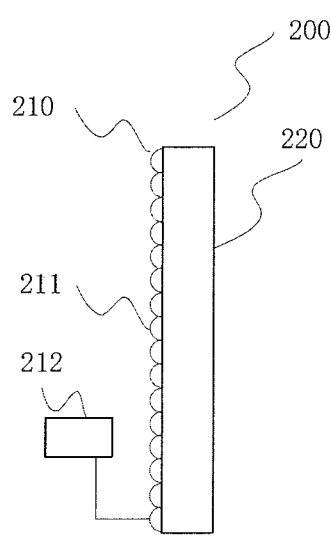
FIG. 2 is a structural schematic diagram of a stereoscopic display device according to an embodiment of the present disclosure.

FIG. 2 is a structural schematic diagram of a stereoscopic display device according to an embodiment of the present disclosure. The stereoscopic display device 200 includes a display unit 220 and a layering-control unit 210 disposed on a light exiting side of the display unit.

The display unit 220 is configured to perform an image display according to a display signal input thereto. It can be implemented using various display technologies in the related art, for example, the display unit 220 may be a liquid crystal display unit, or an organic light emitting diode (i.e., OLED) display unit. Since the OLED has characteristics such as a good light transmittance and being lighter and slimmer, it is more suitable for forming a relatively slim and light display device.

The layering-control unit 210 includes a controllable microlens array 211 and a microlens drive electrode array 212. Microlenses in the controllable microlens array 211 are drivable by drive electrodes of the microlens drive electrode array 212 and exhibit respective focal lengths corresponding to voltages of the drive electrodes of the microlens drive electrode array 212.

The microlens array may comprise a plurality of microlenses uniformly distributed, each microlens being used for separately imaging different display regions on the display unit. In some embodiments, the microlens array 211 may be embodied as a layer of microlens array film layer bonded to the display unit 220, such a film layer has a light control function, and the microlens exhibit different optical properties under different control voltages, thereby having different focal lengths.

Ideally, each microlens of the microlens array is disposed in one-to-one correspondence with a respective one of pixel points of the display unit, the number of the microlenses is the same as the number of pixel points of the display unit. The positions of the pixel points of the display unit are in one-to-one correspondence with the positions of the microlenses. In this way, independent imaging adjustments may be performed for the pixel points, respectively.

At present, due to ever increasing display accuracy of the display unit, the production process of the microlens array sometimes fails to achieve a pixel precision of a high resolution display unit. Therefore, the area of each microlens generally corresponds to an area occupied by a plurality of pixel points. For a plurality of pixel points corresponding to one and the same microlens, the images displayed thereby will be imaged at a same focal length. Therefore, with the microlens array, it is possible to independently image display contents of a region with a fixed size; and by applying different control voltages to the microlenses, an effect of different focal lengths at different positions may be achieved.

The working principle and process of the stereoscopic display device of the present disclosure will be described below with reference to FIGS. 3-5.

Figure 3:
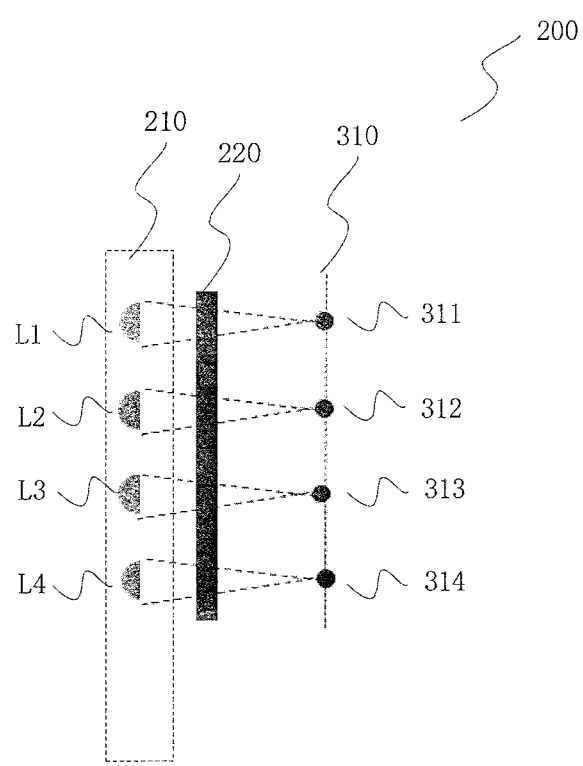
FIG. 3 is a schematic diagram of a scene of a first display state of the stereoscopic display device of the present disclosure.
Figure 4:
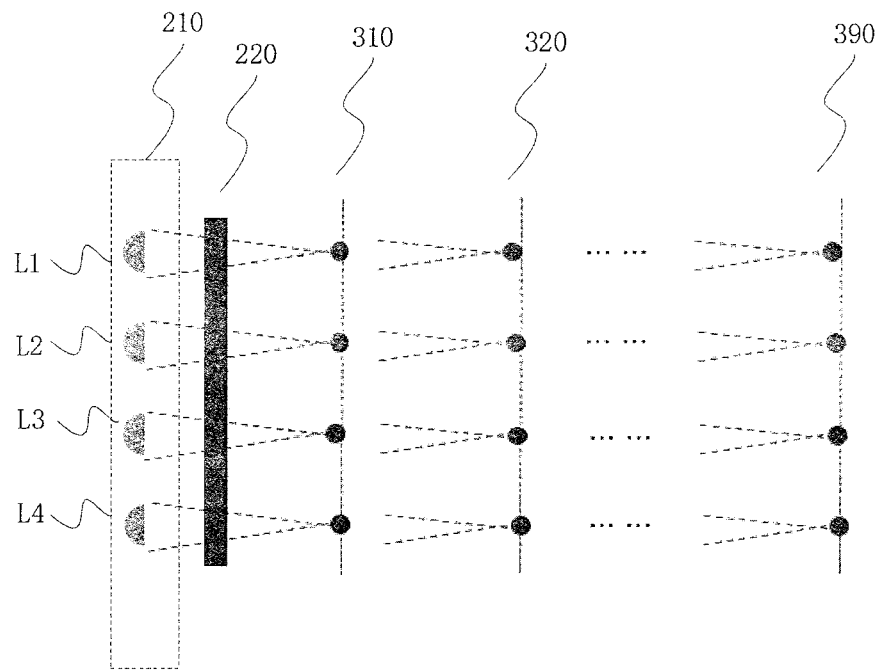
FIG. 4 is a schematic diagram of a scene of a second display state of the stereoscopic display device of the present disclosure.

FIG. 3 is a schematic diagram of a scene of a first display state of the stereoscopic display device of the present disclosure. Here, a case where the microlenses in the microlens array are divided into four sets of microlenses L1, L2, L3, and L4 is taken as an example. It is to be noted that, in order to describe the position of an image plane, each of the schematic diagrams is shown in a side view. Therefore, the arrangement pattern of respective microlenses of the four microlens sets L1, L2, L3, and L4 is not shown, but the each set of individual sets L1, L2, L3, and L4 is illustrated as an integral lens schematically. On the image plane, the pixels on the display unit 220 corresponding to each set of microlens sets L1, L2, L3, and L4 are represented with the abstract imaging patterns 311, 312, 313, and 314, respectively. An imaging pattern is formed by a collection of all image points of respective microlenses in each set of microlenses sets on the image plane. The imaging pattern 311 corresponds to the microlens set L1, the imaging pattern 312 corresponds to the microlens set L2, the imaging pattern 313 corresponds to the microlens set L3, and the imaging pattern 314 corresponds to the microlens set L4.

In the scene of FIG. 3, all of the microlenses have a same focal length, and therefore, all pixels of the display unit 220 are imaged on the image plane 310 through the microlens array. That is, the imaging patterns 311, 312, 313, and 314 are all located in a same image plane. At this time, all of the image points are presented on a same plane, failing to present information of a depth of field, so the effect of the stereoscopic display is relatively poor. In the related art, some of the parallax images type displays use a microlens array with a fixed focal length to realize different image display at the left and right eyes. The focal length of the lens is constant, and the image of the display is displaced at a fixed angle, which is completely different from the principle and control idea of the stereoscopic display of the present disclosure.

In the stereoscopic display device of the present disclosure, when a same control voltage is applied to all of the microlenses, the display state shown in FIG. 3 may be presented. Referring to FIG. 4, the pixels of the display unit may be imaged at image planes of different depths, such as the image planes 310, 320, . . . 390 shown in FIG. 4, depending on different control voltages as applied.

In order to obtain a better stereoscopic display effect, different control voltages may be applied to each set of microlens sets L1, L2, L3 and L4, such that corresponding imaging patterns are respectively located in different image planes, thereby providing a display with different depths of field for different pixels of the display unit, and obtaining a stereoscopic display effect.

Figure 5:
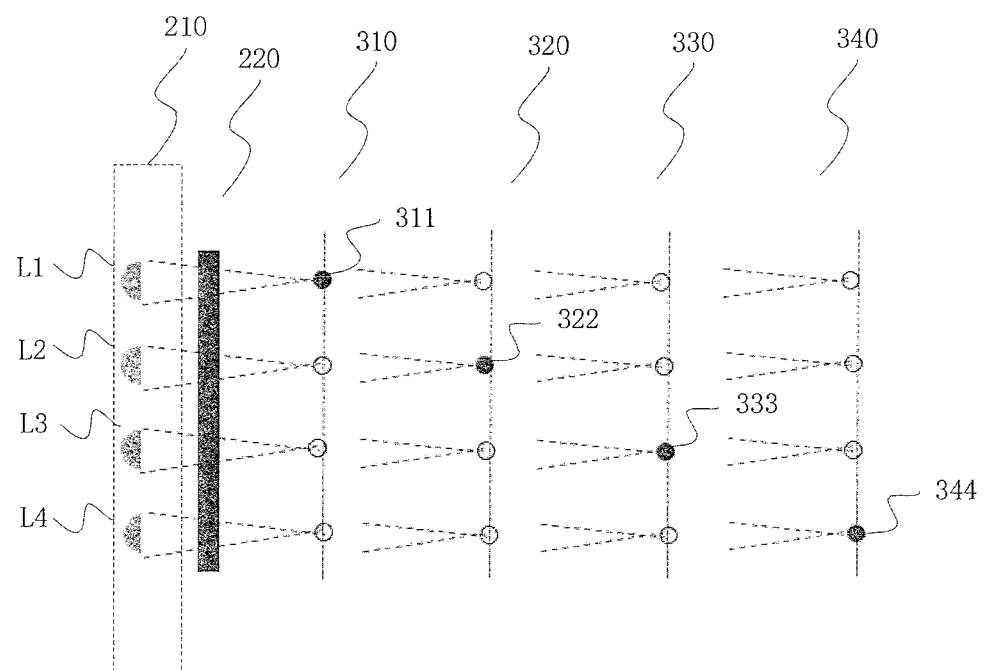
FIG. 5 is a schematic diagram of a scene of a third display state of the stereoscopic display device of the present disclosure.

Referring to FIG. 5, FIG. 5 is a schematic diagram of a scene of a third display state of the stereoscopic display device of the present disclosure. Under the effect of the corresponding control voltages, those pixel points of the display unit corresponding to the microlens set L1 are imaged on the image plane 310 and form an imaging pattern 311; those pixel points of the display unit corresponding to the microlens set L2 are imaged on the image plane 320 and form an imaging pattern 322; those pixel points of the display unit corresponding to the microlens set L3 are imaged on the image plane 330 and form an imaging pattern 333; those pixel points of the display unit corresponding to the microlens set L4 are imaged on the image plane 340 and form an imaging pattern 344. Each image plane corresponds to a display plane constituting each display layer of the stereoscopic display device 10 of FIG. 1, thereby achieving a stereoscopic display.

With the stereoscopic display device of the present disclosure, a stereoscopic display can be realized with a single display unit by a focus adjustment to the microlenses. Since it is not necessary to provide a plurality of display layers, the brightness loss is reduced, and the display accuracy does not have to be limited by the positioning accuracy of each display layer, thereby improving the effect of stereoscopic display compared with the existing multi-layer display layer. The device has a simple structure, may be made by a simplified manufacturing process, and does not require a precise alignment of the display layer, and thus is easy to produce. At the same time, the entire display device can be made lighter and thinner due to a single display layer.

The working process of the stereoscopic display device and the stereoscopic display control method of the present disclosure will be described in detail below with reference to FIGS. 6 and 7.

Figure 6:
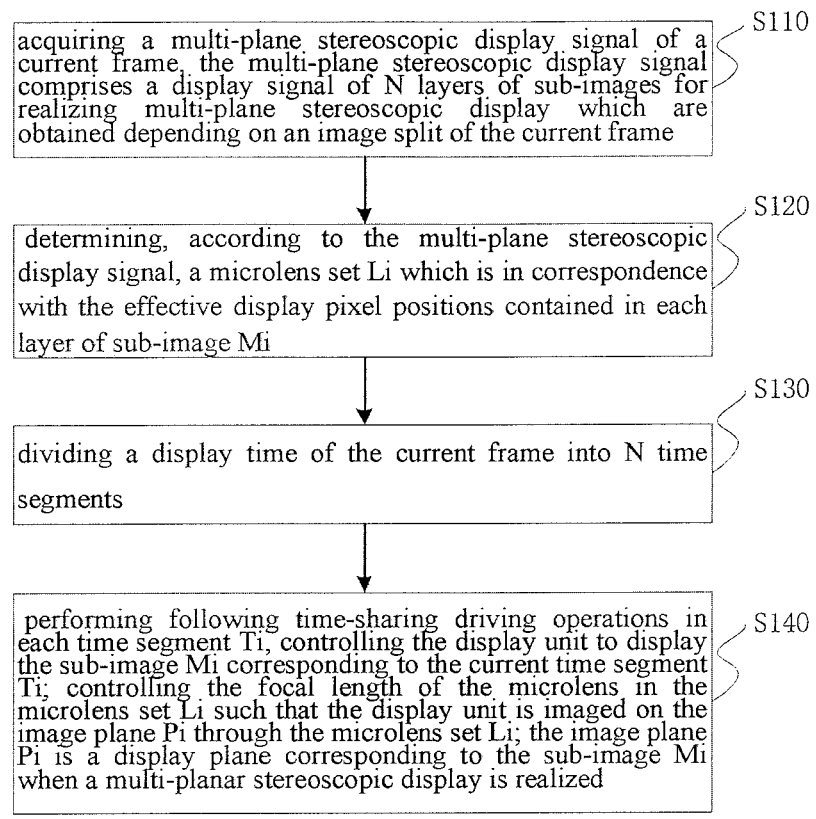
FIG. 6 is a schematic flow chart of a stereoscopic display control method according to an embodiment of the present disclosure.

FIG. 6 is a schematic flow chart of a stereoscopic display control method according to an embodiment of the present disclosure. The stereoscopic display control method can be used for display control to the stereoscopic display device of each of the above embodiments. Referring to FIG. 6, the stereoscopic display control method of the present disclosure may include steps S110 to S140.

In step S110, acquiring a multi-plane stereoscopic display signal of a current frame, the multi-plane stereoscopic display signal comprises a display signal of N layers of sub-images for realizing multi-plane stereoscopic display which are obtained by an image split of the current frame, where N is an integer greater than or equal to 2, and the sub-image comprises effective display pixels and non-effective display pixels.

The display signal of the N-layer sub-image for realizing the multi-plane stereoscopic display is similar to the display signal of each display layer in the multi-plane stereoscopic display mode in the related art, and may be calculated or obtained in a manner similar to the related art. The sub-images of each layer are used to display different portions of the stereoscopic image, respectively, so that the viewer can feel a visual stereoscopic experience utilizing different depths of the image plane. The sub-images of each layer have the same size as the current frame image, and the effective display pixels correspond to the pixels that need to be displayed in each layer of sub-image, and the remaining portions that do not need to be displayed serve as non-effective display pixels.

In some embodiments, the step of the acquiring the multi-plane stereoscopic display signal of the current frame may comprise: obtaining an image of the current frame; determining a depth of field of each pixel location in the image according to the image of the current frame; performing an image split to the pixel points according to a preset range of depth of field, and dividing the pixel points into N sets depending on a range of the depth of field to which the depth of field of each of the pixel points belongs; taking the pixel points in each set as effective pixel points in the sub-image of a corresponding layer.

In step S120, determining, according to the multi-plane stereoscopic display signal, a microlens set Li, i ∈[1, N] which is in correspondence with the effective display pixel positions contained in each layer of sub-image Mi.

Specifically, the step of determining, according to the multi-plane stereoscopic display signal, a microlens set Li which is in correspondence with the effective display pixel positions contained in each layer of sub-image Mi may comprise: determining a position distribution pattern Pi of the effective display pixels contained in each layer of sub-image Mi; determining, according to the position distribution pattern Pi of the effective display pixels, a microlens set Li corresponding to the positions of the effective display pixels.

In step S130, dividing a display time of the current frame into N time segments.

According to the number of layers N of the sub-image, the display time of the current frame is correspondingly divided into N time segments, and in each time segment, the sub-images of different layers are respectively imaged, with the help of a visual persistence of the human eye, the viewer may watch the full stereo image. Thus, by time-sharing imaging, it is possible to avoid interference when various layers of the sub-layer images are simultaneously displayed. The space separation and time division are combined to form a composite control scheme.

Figure 7:
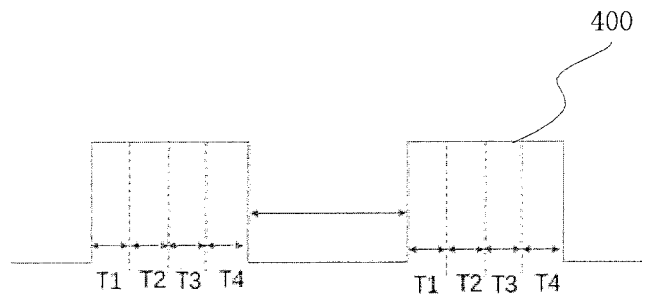
FIG. 7 is a control timing diagram of a stereoscopic display control method according to an embodiment of the present disclosure.

Referring to FIG. 7, FIG. 7 is a control timing diagram of a stereoscopic display control method according to an embodiment of the present disclosure. Taking a case where a stereo display is performed by dividing into 4 display layers as an example, the display period 400 of each frame of the image is divided into 4 time segments. In a case where a stereo display is performed by dividing into N display layers as an example, the display period of the current frame of the image is divided into N time segments. N is a positive integer. For convenience of explanation, each time segment Ti and a corresponding sub-image Mi and a microlens set Li may be matched to each other to form collectively into a group.

In step S140, performing following sub-steps S141 and S142 of time-sharing driving operations in each time segment Ti:

In sub-step S141, controlling the display unit to display the sub-image Mi corresponding to the current time segment Ti.

In sub-step S142, controlling the focal length of the microlens in the microlens set L1 such that the display unit is imaged on a image plane Pi through the microlens set Li; the image plane Pi is a display plane corresponding to the sub-image Mi when a multi-planar stereoscopic display is realized.

The step of controlling the focal length of the microlens may be achieved by applying a control voltage Ui to the control electrodes of the respective microlenseses in the microlens set Li.

When controlling the display unit to display the sub-image Mi corresponding to the current time segment Ti, the purpose is to enable the effective display pixels to be imaged on the corresponding image plane while minimizing an interference of the non-effective display pixels on imaging. Therefore, the effective display pixels in the sub-image Mi can be normally displayed. For the non-effective display pixels in the sub-image Mi, different display strategies may be adopted according to different types of display units.

A full dark display of the lowest brightness of the non-effective display pixels is performed under control when the display unit is a liquid crystal display unit having a backlight, thereby reducing the interference. Positions corresponding to the non-effective display pixels are controlled to be in a transparent state rather than to be displayed, when the display unit is an Organic Light Emitting Diode (OLED) display unit without a backlight.

After performing the time-sharing driving operation, in the T1 period, the display unit displays the sub-image M1 imaged by the microlens set L1, see FIG. 5, at this time, the effective display pixels in the sub-image M1 are imaged in the image plane 310 through the microlens set L1, and an imaging pattern 311 is formed. In the T2 period, the display unit displays the sub-image M2 imaged by the microlens set L2, at this time, the effective display pixels in the sub-image M2 are imaged in the image plane 320 through the microlens set L2, and an imaging pattern 322 is formed. In the T3 period, the display unit displays the sub-image M3 imaged by the microlens set L3, at this time, the effective display pixels in the sub-image M3 are imaged in the image plane 330 through the microlens set L3, and an imaging pattern 333 is formed. In the T4 period, the display unit displays the sub-image M4 imaged by the microlens set L4, at this time, the effective display pixels in the sub-image M4 are imaged in the image plane 340 through the microlens set L4, and an imaging pattern 344 is formed.

By separately driving the regions in which the microlens sets L1, L2, L3, and L4 are located in a time-sharing manner, applying different voltages to the electrodes of different regions in different time periods, and imaging the pixels of the display unit on different image planes respectively, an effect of adjusting the focal lengths and controlling the depths of field may be realized.

With the stereoscopic display control method of the present disclosure, a stereoscopic display can be realized with a single display unit by a focal adjustment to the microlens. Since it is not necessary to provide a plurality of display layers, the brightness loss is reduced, and the display accuracy does not have to be limited by the positioning accuracy of each display layer, thereby improving the effect of stereoscopic display compared with the existing multi-layer display layer.

Embodiments of the third aspect of the present disclosure provide a non-transitory computer readable storage medium in which executable instructions are stored. When the executable instructions are run on a processor, the stereoscopic display method according to the embodiments of the first aspect of the present disclosure are realized. The storage medium may be disposed in a device as a part thereof; or when the device is remotely controllable by a server, the storage medium may be disposed on a remote equipment that controls the device. The non-transitory computer readable medium can include any computer readable medium, except for the signal itself being propagated temporarily.

The present disclosure also provides a display including a stereoscopic display device according to an embodiment of the first aspect of the present disclosure. With the stereoscopic display of the present disclosure, a stereoscopic display can be realized with a single display unit by a focus adjustment to the microlenses. Since it is not necessary to provide a plurality of display layers, the brightness loss is reduced, and the display accuracy does not have to be limited by the positioning accuracy of each display layer, thereby improving the effect of stereoscopic display compared with the existing multi-layer display layer. The device has a simple structure, may be made by a simplified manufacturing process, and does not require a precise alignment of the display layers, and thus is easy to produce. At the same time, the entire display device can be made lighter and thinner due to a single display layer.

It should be noted that, in the description of the specification, any process or method description in the flowcharts or otherwise described herein may be understood to include a module, a segment or a portion containing codes of executable instructions of one or more steps for implementing a particular logical function or process, and the scope of the preferred embodiments of the disclosure includes other implementations, in which the functions are performed not in the order shown or discussed, including in a substantially simultaneous manner or in a reverse order depending on the functionality involved, which should be understood by those skilled in the art to which the embodiments of the present disclosure pertain.

The logic and/or steps represented in the flowchart or otherwise described herein, for example, may be considered as an ordered list of executable instructions for implementing logical functions, and may be embodied in any computer readable medium to be used by an instruction execution system, apparatus, or device (e.g., a computer-based system, a system including a processor, or other system that can fetch instructions and execute instructions from an instruction execution system, apparatus, or device), or to be used in conjunction with these instruction execution system, apparatus, or device. For this specification, a "computer-readable medium" can be any device that can contain, store, communicate, propagate, or transport a program to be used by or be used in conjunction with an instruction execution system, apparatus, or device. More specific examples (non-exhaustive list) of computer readable media include the following: electrical connections (electronic devices) having one or more wires, portable computer disk cartridges (magnetic devices), random access memory (RAM), Read only memory (ROM), erasable editable read only memory (EPROM or flash memory), fiber optic devices, and portable compact disk read only memory (CDROM). In addition, the computer readable medium may even be a paper or other suitable medium on which the program can be printed, as it may be optically scanned, for example on paper or other medium, followed by editing, interpretation or, if appropriate, other suitable method to be processed to obtain the program electronically and then stored it in a computer memory.

It should be understood that portions of the present disclosure can be implemented in hardware, software, firmware, or a combination thereof. In the above-described embodiments, multiple steps or methods may be implemented with a software or a firmware stored in a memory and executed by a suitable instruction execution system. For example, if implemented with a hardware, as in another embodiment, it can be implemented by any one or combination of the following techniques well known in the art: discrete logic circuits having logic gates for implementing logic functions on data signals, specific integrated circuits with suitable combinational logic gates circuits, programmable gate arrays (PGAs), field programmable gate arrays (FPGAs), etc.

Those skilled in the art may understand that all or part of the steps carried by the method for implementing the above embodiments can be completed by a program to instruct related hardware, and the program can be stored in a computer readable storage medium. When the program is executed, one or a combination of the steps of the method embodiments is included.

In the description of the present specification, the description with reference to the terms "one embodiment", "some embodiments", "example", "specific example", or "some examples" and the like means a specific feature, a structure, a material, or a character described in connection with the embodiment or example is included in at least one embodiment or example of the present disclosure. In the present specification, the schematic representation of the above terms is not necessarily directed to a same embodiment or example. Furthermore, the particular features, structures, materials, or characteristics described may be combined in a suitable manner in any one or more embodiments or examples. In addition, various embodiments or examples described in the specification and features of various embodiments or examples may be combined and combined without departing from the scope of the invention without contradicting each other.

Moreover, the terms "first" and "second" are used for descriptive purposes only and are not to be construed as indicating or implying a relative importance or implicitly indicating the number of technical features indicated. Thus, features defining "first" and "second" may include at least one of the features, either explicitly or implicitly. In the description of the present disclosure, the meaning of "a plurality" is two or more, for example two, three, etc., unless specifically defined otherwise.

While the embodiments of the present disclosure have been shown and described above, it is understood that the foregoing embodiments are illustrative and are not to be construed as limiting the scope of the disclosure. Those skilled in the art may make variations, modifications, and substitutions in the scope of the present disclosure.

What is claimed is:

1. A stereoscopic display control method for performing a display control to a stereoscopic display device comprising a display unit and a layering-control unit on a light exiting side of the display unit, wherein the layering-control unit comprising a microlens drive electrode array and a microlens array being controllable, and wherein microlenses in the microlens array being controllable are driven by drive electrodes of the microlens drive electrode array and exhibit respective focal lengths corresponding to voltages of the drive electrodes of the microlens drive electrode array; the microlens array comprises a plurality of microlens sets, each microlens set being used to independently image different display regions of the display unit respectively, the stereoscopic display control method comprises steps as follows:

acquiring a multi-plane stereoscopic display signal of the current frame, the multi-plane stereoscopic display signal comprises a display signal of N layers of sub-images for realizing multi-plane stereoscopic display which are obtained by an image split of the current frame, where N is an integer greater than or equal to 2, and the sub-image comprises effective display pixels and non-effective display pixels;

determining, according to the multi-plane stereoscopic display signal, a microlens set Li, i∈[1, N] which is in correspondence with the effective display pixel positions contained in each layer of sub-image Mi;

dividing a display time of the current frame into N time segments;

performing following time-sharing driving operations in each time segment Ti:

controlling the display unit to display the sub-image Mi corresponding to the current time segment Ti;

controlling the focal length of the microlens in the microlens set Li such that the display unit is imaged on a image plane Pi through the microlens set Li; the image plane Pi is a display plane corresponding to the sub-image Mi when a multi-planar stereoscopic display is realized.

2. The stereoscopic display control method according to claim 1, wherein the step of the acquiring the multi-plane stereoscopic display signal of the current frame comprises:
obtaining an image of the current frame;
determining a depth of field of each pixel location in the image according to the image of the current frame;
performing an image split to the pixel points according to a preset range of depth of field, and dividing the pixel points into N sets depending on respective range of the depth of field to which the depth of field of each of the pixel points belongs;
taking the pixel points in each set as effective pixel points in the sub-image of a corresponding layer.

3. The stereoscopic display control method according to claim 1, wherein the step of determining, according to the multi-plane stereoscopic display signal, a microlens set Li which is in correspondence with the effective display pixel positions contained in each layer of sub-image Mi comprises:
determining a position distribution pattern Pi of the effective display pixels contained in each layer of sub-image Mi;
determining, according to the position distribution pattern Pi of the effective display pixels, a microlens set Li corresponding to the positions of the effective display pixels.

4. The stereoscopic display control method according to claim 1, wherein the step of controlling the display unit to display the sub-image Mi corresponding to the current time segment Ti:
controlling the display unit to normally display the effective display pixels in the sub-image Mi;
displaying the non-effective display pixels in the sub-image Mi in following manner:
controlling to perform a full dark display of the lowest brightness of the non-effective display pixels when the display unit is a liquid crystal display unit having a backlight;
controlling the position corresponding to the non-effective display pixel not to be displayed and to be in a transparent state when the display unit is an Organic Light Emitting Diode (OLED) display unit without a backlight.

5. A non-transitory computer readable storage medium in which a computer program has been stored, wherein the stereoscopic display control method according to claim 1 is implemented when the computer program is executed by a computer processor.

* * * * *